(12) United States Patent
Kawada et al.

(10) Patent No.: US 10,393,509 B2
(45) Date of Patent: Aug. 27, 2019

(54) PATTERN HEIGHT MEASUREMENT DEVICE AND CHARGED PARTICLE BEAM DEVICE

(71) Applicant: Hitachi High-Technologies Corporation, Minato-ku, Tokyo (JP)

(72) Inventors: Hiroki Kawada, Tokyo (JP); Katsuhiro Sasada, Tokyo (JP); Takenori Hirose, Tokyo (JP); Shou Takami, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 15/329,504

(22) PCT Filed: Jul. 30, 2014

(86) PCT No.: PCT/JP2014/069991
§ 371 (c)(1),
(2) Date: Jan. 26, 2017

(87) PCT Pub. No.: WO2016/016957
PCT Pub. Date: Feb. 4, 2016

(65) Prior Publication Data
US 2017/0211929 A1 Jul. 27, 2017

(51) Int. Cl.
G01B 15/00 (2006.01)
G01B 11/06 (2006.01)
G01B 15/02 (2006.01)

(52) U.S. Cl.
CPC ...... *G01B 11/0608* (2013.01); *G01B 11/0625* (2013.01); *G01B 15/02* (2013.01); *G01B 2210/56* (2013.01)

(58) Field of Classification Search
CPC .......................... G01B 11/0608; G01B 15/02; G01B 2210/56; H01J 37/317
(Continued)

(56) References Cited

U.S. PATENT DOCUMENTS 6,753,972 B1 6/2004 Hirose et al.
10,101,150 B2 * 10/2018 Kawada ................ G01B 15/00
(Continued)

FOREIGN PATENT DOCUMENTS

JP 2002-93870 A 3/2002
JP 2009-150832 A 7/2009
(Continued)

OTHER PUBLICATIONS

International Search Report (PCT/ISA/210) issued in PCT Application No. PCT/JP2014/069991 dated Nov. 4, 2014 with English-language translation (two (2) pages).
(Continued)

*Primary Examiner* — Hoa Q Pham
(74) *Attorney, Agent, or Firm* — Crowell & Moring LLP

(57) ABSTRACT

A pattern height measurement device capable of high-precision measurement of the dimensions of a fine pattern, and a charged particle beam device are provided. The pattern height measurement device includes a calculation device that determines dimensions of a sample, in the height direction, based on first reflected light information obtained by dispersing light reflected from a sample. The calculation device determines second reflected light information based on a formula for the relationship between the value for the dimension in the sample surface direction of a pattern formed upon the sample, obtained by irradiation of a charged particle beam on the sample, the value for the dimension in the height direction of the sample, and reflected light information; compares a second reflected light intensity and the first reflected light information; and outputs the value for the dimension in the height direction of the sample in the second reflected light information.

13 Claims, 5 Drawing Sheets

(58) Field of Classification Search
USPC .......... 356/237.1–237.5, 625–640, 319, 394;
250/311, 396 R, 397; 438/7, 16
See application file for complete search history.

(56) References Cited

U.S. PATENT DOCUMENTS

| | | | |
|---|---|---|---|
| 10,184,790 B2* | 1/2019 | Kawada | G01B 15/00 |
| 2004/0070772 A1* | 4/2004 | Shchegrov | G01N 21/211 |
| | | | 356/625 |
| 2009/0161244 A1 | 6/2009 | Hirose et al. | |
| 2009/0325326 A1* | 12/2009 | Park | G01J 3/447 |
| | | | 438/16 |
| 2010/0274521 A1* | 10/2010 | Rabello | G06F 17/5018 |
| | | | 702/127 |
| 2011/0020956 A1 | 1/2011 | Nemoto et al. | |
| 2016/0329186 A1* | 11/2016 | Li | H01J 37/1472 |

FOREIGN PATENT DOCUMENTS

| | | |
|---|---|---|
| JP | 4460659 B2 | 5/2010 |
| JP | 2011-27461 A | 2/2011 |

OTHER PUBLICATIONS

Japanese-language Written Opinion (PCT/ISA/237) issued in PCT Application No. PCT/JP2014/069991 dated Nov. 4, 2014 (four (4) pages).

* cited by examiner

[Fig. 1]
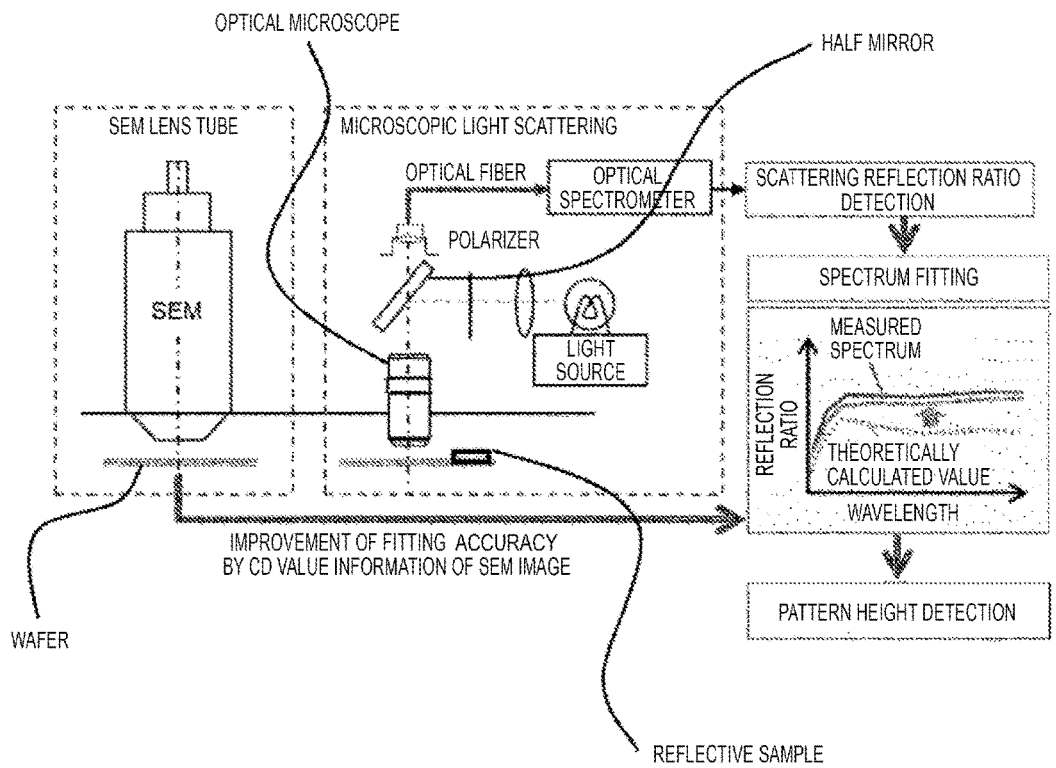
[Fig. 2]
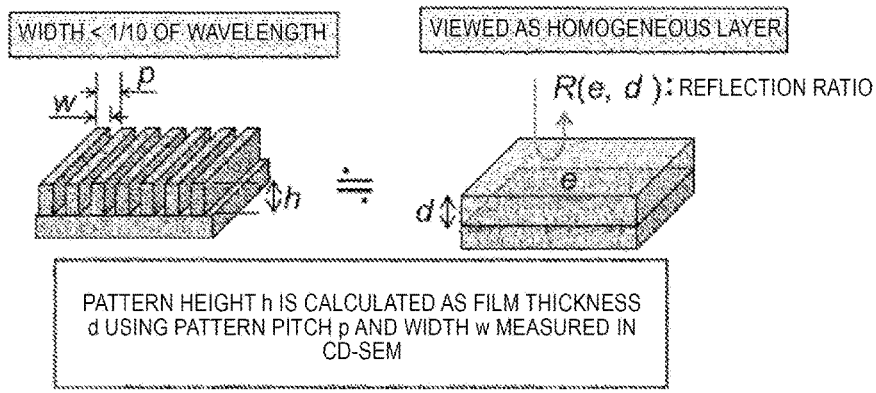

[Fig. 3]
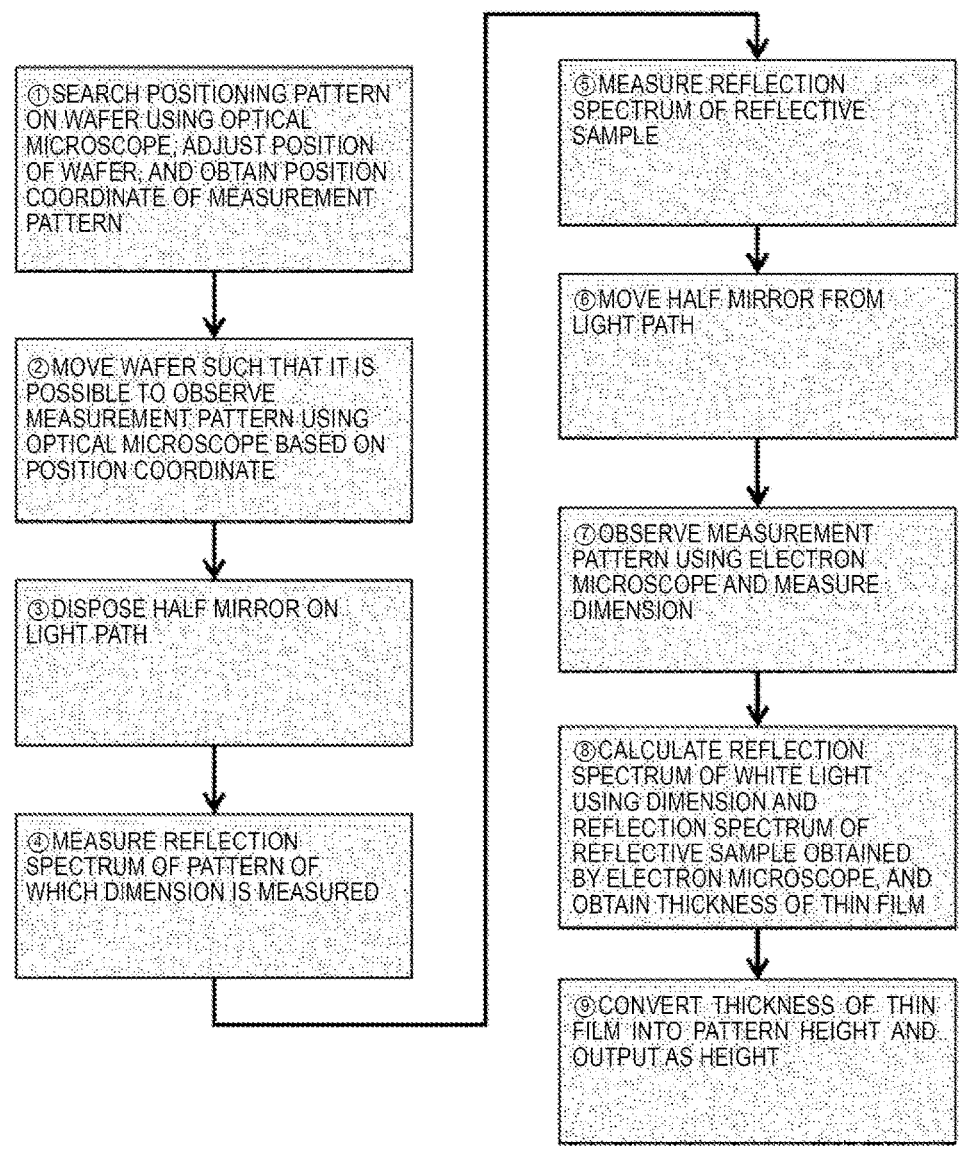

[Fig. 4]
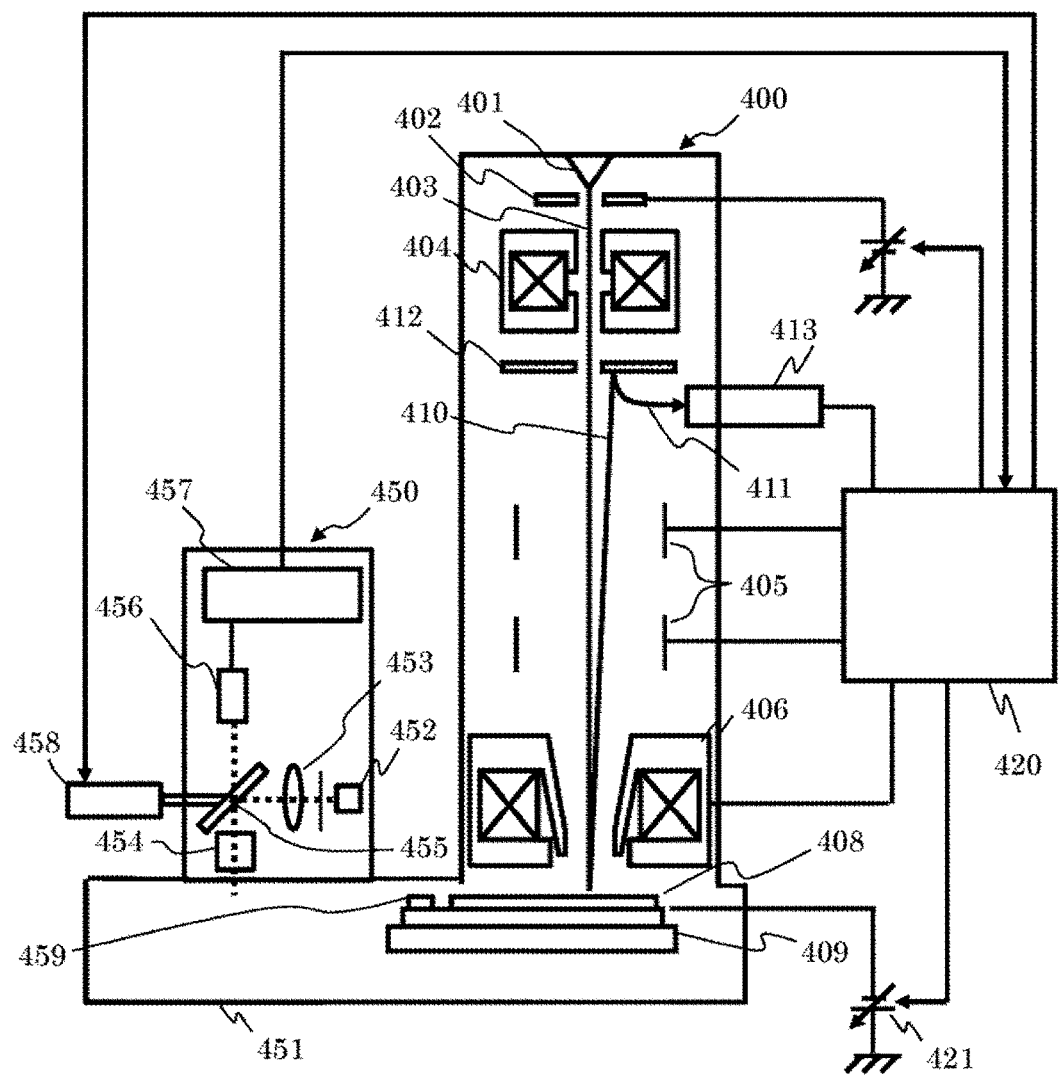

[Fig. 5]
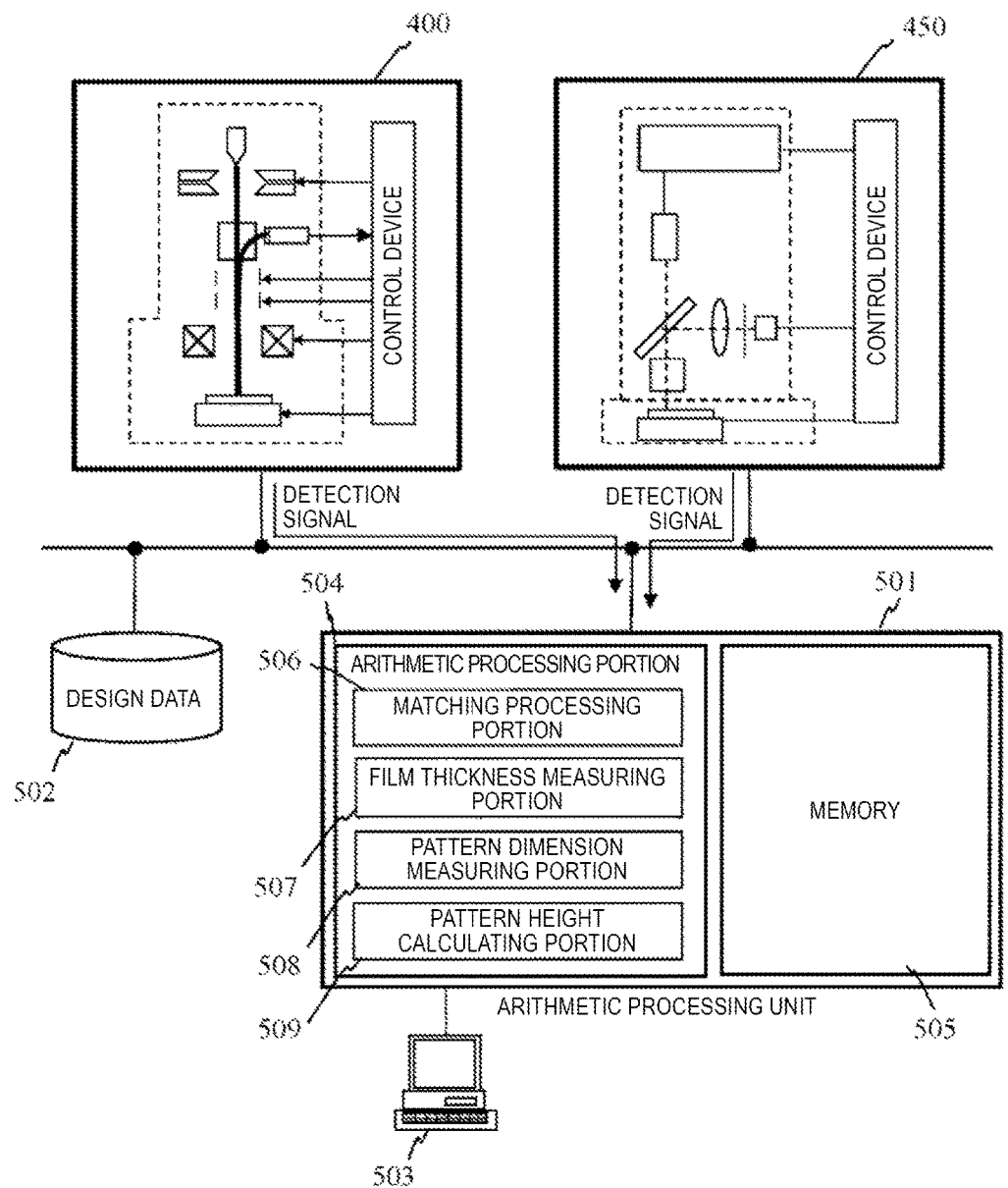

[Fig. 6]
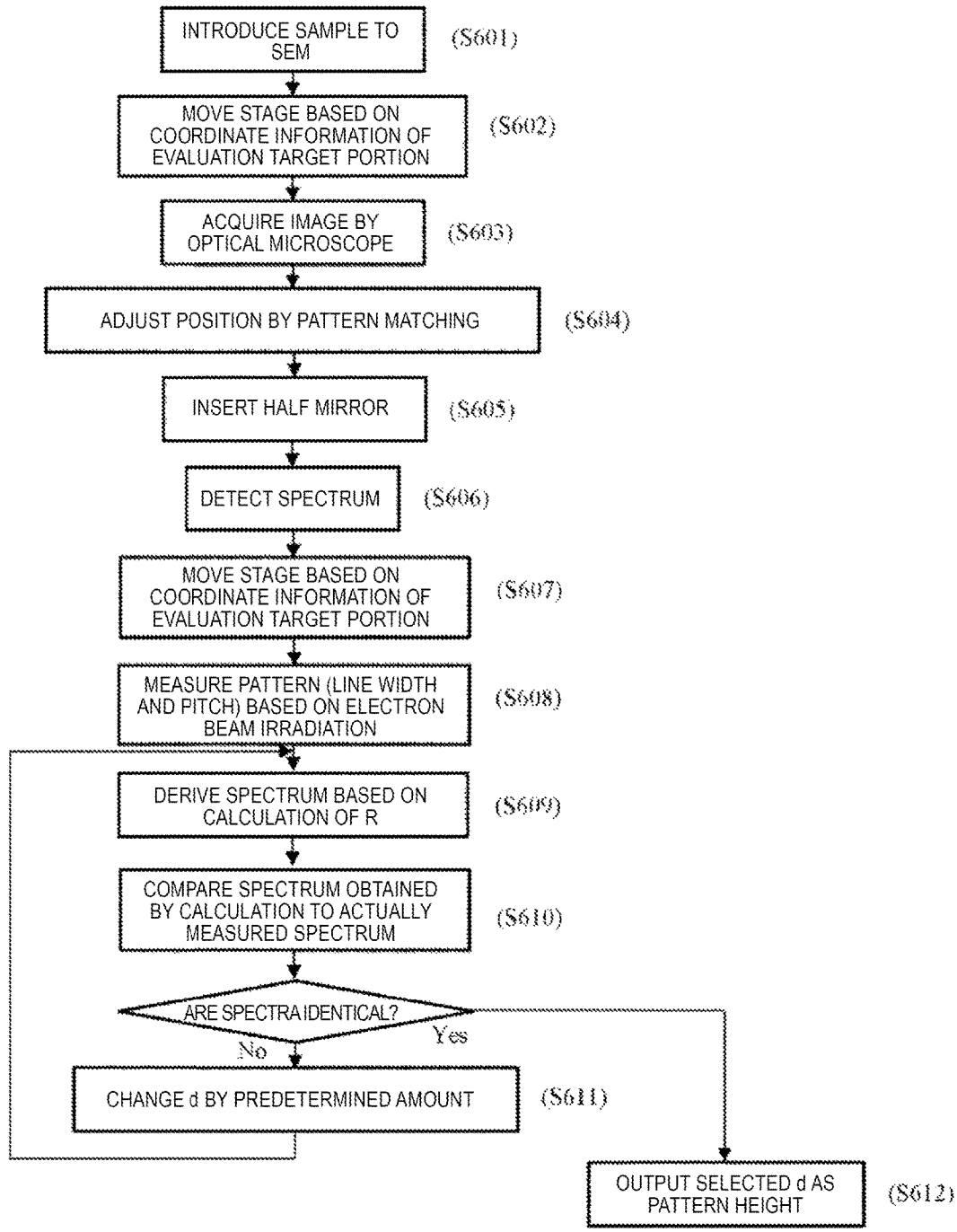

US 10,393,509 B2

PATTERN HEIGHT MEASUREMENT DEVICE AND CHARGED PARTICLE BEAM DEVICE

TECHNICAL FIELD

The present invention relates to a height measurement device that measures a height of a pattern or the like formed on a sample, particularly to a height measurement device that measures a height of a fine pattern.

BACKGROUND ART

In the further, process control is expected to be very important, when an electron microscope or an optical inspection device is used, with miniaturization of semiconductor devices. PTL 1 discloses a film thickness measuring device that measures a film thickness of a thin film, during a flattening process of the thin film as one process of semiconductor manufacturing processes. PTL 1 describes the film thickness measuring device that irradiates the thin film with white light so as to evaluate a state of processing performed using a chemical mechanical polishing (CMP) method, and performs film thickness measurement, on the basis of spectral analysis of reflected light.

CITATION LIST

Patent Literature

[PTL 1] Japanese Patent No. 4460659 (corresponding U.S. Pat. No. 6,753,972)

SUMMARY OF INVENTION

Technical Problem

With currently growing demand for higher integration of additional semiconductor devices, three-dimensional structuring of a pattern that configures a circuit is developed. With the development of the three-dimensional structure, control of dimension of the pattern in a height direction is expected to be highly important. Although the film thickness measuring device as disclosed in PTL 1 is suitable for measuring the film thickness of the thin film having a thickness which is uniform over a broad range, it is difficult to perform evaluation of a fine pattern having, for example, a line width of several nm to tens of nm.

On the other hand, high integration of semiconductor devices has mainly aimed at densification through miniaturization of a pattern that configures a circuit, and thus, in order to evaluate a line width or the like of the pattern, which is formed to be several nm to tens of nm, for example, a critical dimension-scanning electron microscope (CD-SEM) has been used. However, the electron microscope having a depth of focus, which is relatively deeper than that of the optical inspection device, is a device that is not suitable for measuring the height direction.

As described above, it is difficult for both of the optical film thickness measuring device and the electron microscope to measure the dimension of a fine pattern in the height direction, the advent of a device that measures the dimension of the fine pattern in the height direction with high accuracy is expected to be desirable, for further three-dimensional structuring of the semiconductor devices in the future.

Hereinafter, a height measurement device that aims to measure dimensions of a fine pattern in a height direction with high accuracy; and a charged particle beam device are proposed.

Solution to Problem

As an aspect to achieve the object described above, there is provided a pattern height measurement device that is provided with a calculation device that calculates a dimension of a sample in a height direction, on the basis of first reflected light information acquired by dispersing reflected light produced when the sample is irradiated with light. The calculation device calculates second reflected light information on the basis of a formula for a relationship between a value for dimension of a pattern formed on the sample in a surface direction of the sample, which is obtained by irradiating the sample with a charged particle beam, a value for a dimension of the sample in the height direction, and reflected light information, compares the second reflected light intensity and the first reflected light information, and outputs, as the dimension of the pattern in the height direction, a value for the dimension of the sample in the height direction in the second reflected light information, which is obtained when the first reflected light information and the second reflected light information satisfy a predetermined condition.

As another aspect to achieve the object described above, there is provided a charged particle beam device that is provided with a calculation device that measures a dimension of a pattern formed on a sample, on the basis of a detection signal acquired by scanning of a charged particle beam emitted from a charged particle source, the charged particle beam device including: an optical device that detects reflected light produced when the sample is irradiated with light. The calculation device calculates a height of the pattern on the basis of first reflected light information of the optical device, and the detection signal acquired by scanning of the charged particle beam.

Advantageous Effects of Invention

In this configuration described above, it is possible to measure a dimension of a fine pattern in a height direction with accuracy.

BRIEF DESCRIPTION OF DRAWINGS

FIG. 1 is a diagram illustrating an overview of a pattern height measurement device.

FIG. 2 is a diagram illustrating a concept of height measurement.

FIG. 3 is a flowchart illustrating processes of the height measurement using an optical microscope and an electron microscope.

FIG. 4 is a diagram illustrating an example of a scanning electron microscope including the optical microscope.

FIG. 5 is a diagram illustrating an example of a measurement system including the optical microscope and the scanning electron microscope.

FIG. 6 is a flowchart illustrating processes of the height measurement using the optical microscope and the electron microscope.

DESCRIPTION OF EMBODIMENTS

An example to be described below relates to a measurement device that mainly measures a height of a semiconductor device or the like, and a computer program for causing a computer to execute calculation for height measurement. In recent years, necessity of measurement of a height of a fine shape highly increases in manufacturing processes of a semiconductor device. For example, since a Fin line pattern of a FinFET device having a three-dimensional structure is a passage of a switching current, it is necessary to achieve evenness in not only a line width, but also a height dimension. In order to perform process control of a fine pattern, it is desirable to use a charged particle beam device such as an electron microscope that is capable of performing evaluation of the fine pattern. However, since it is difficult to acquire information of a height direction from a top-down image obtained through beam irradiation in a perpendicular direction with respect to a sample surface direction, it is considered to measure a dimension of a pattern in the height direction by tilting an electron beam of the electron microscope and observing a side wall or the like of the pattern in an inclined direction.

However, in recent years, miniaturization is developed in a device structure. When an interval between adjacent two lines is only 20 nm, in order to measure a height by viewing a bottom positioned about 40 nm below therefrom, the beam has to be tilted by a tilting angle of about several degrees from the vertical axis. Under such restricted conditions, it is very difficult to measure the height by a degree of nanometer with accuracy. In addition, when a height dimension is to be measured by means other than the electron microscope, in a mass-production factory of a device, problems has arisen in that a throughput or measurement accuracy is degraded, or machine maintenance costs increase, and thus it is not possible to perform application to production.

Examples to be described below propose a charged particle beam device, a measurement system, and a measurement device which include measurement means that is good in all of the throughput, the measurement accuracy, and the machine maintenance costs, by modifying the electron microscope to the smallest extent.

Hereinafter, a height measurement device that includes an optical microscope and an electron microscope will be described. The height measurement device causes white light to be incident to a light path of the optical microscope, analyzes, by using a pseudo thin film analysis method, an optical spectrum obtained by measuring reflected light from a wafer, and calculates a height of a fine pattern. Particularly, a height evaluating method using both of height evaluation results by the optical microscope and dimension measurement results by the electron microscope is described. According to such a method, it is possible to perform the height measurement of the fine pattern with high accuracy, and, as a result, it is possible to perform control of process change in an up-to-date device to which development of three-dimensional structuring is applied.

FIG. 1 illustrates an example of a device configuration of height measurement. The electron microscope illustrated in FIG. 1 is an electron microscope that aims at dimension measurement of a semiconductor device pattern, and further is provided with an optical microscope for observing a positioning pattern formed on a wafer. In the electron microscope, a magnification of 1,000 times or higher is used; however, in order to find the positioning pattern formed on a wafer having a diameter of 300 mm, it is difficult to efficiently find the pattern because a field of sight is too narrow with too high magnification. The electron microscope illustrated in FIG. 1 is provided with the optical microscope that is capable of being used in observation under low magnification. According to the electron microscope provided with the optical microscope, it is possible to control a position of the semiconductor device pattern on a wafer, as a coordinate representing a relative position with respect to the positioning pattern. In order to automatically measure a pattern dimension, it is desirable to perform control, based on an algorithm of searching for the positioning pattern in the optical microscope.

In the example, an example, in which a half mirror is mainly disposed on a light path of the optical microscope for observation of the positioning pattern, and thereby the optical microscope has two functions of detecting the positioning pattern and performing the height measurement, is described. Note that the half mirror may move on the light path only when the height measurement is performed so as not to interfere with the light path when the observation of the positioning pattern is performed.

A light source of the optical microscope is, for example, a halogen lamp, and white light including light having a wavelength of about 300 nm to 800 nm passes through a polarizer, is reflected from the half mirror, and is guided into the optical microscope. The light source may be a combination of a plurality of LEDs that emit only a specific wavelength. The light reflected from the wafer is condensed in the optical microscope, passes through the half mirror, and is transmitted to an optical spectrometer via an optical fiber. In the optical spectrometer, a spectrum indicating intensity of light due to the wavelength is detected as spectral reflection ratio. Meanwhile, spectra at various heights of the pattern on the wafer are listed as theoretically calculated values, a pattern height is obtained when the theoretically calculated value is most equal to a measurement spectrum, and the result is output as the pattern height.

Before or after the measurement by using the optical microscope, the pattern dimension obtained when the front surface of the wafer is observed in a top-down direction with the electron microscope is measured. This dimension is substituted in theoretical calculation of the spectrum, and the theoretically calculated value is obtained with higher accuracy.

In addition, a reflective sample is disposed on or in the vicinity of the wafer, and a spectrum obtained by measuring the dimensions before and after the measurement described above may be subtracted from the spectrum obtained by measuring the device pattern. In this manner, it is possible to cancel errors occurring due to changes with time of the polarizer, the half mirror, the light path of the white light, the optical microscope, or the optical fiber or the like. The reflective sample may be a piece of a mirror wafer on which no pattern is formed. Otherwise, a region without a pattern on the top surface of the wafer, on which the pattern is formed, may be measured as the reflective sample.

FIG. 2 is a view illustrating a principle of height measurement of the pattern by using both of the optical microscope and a scanning electron microscope. For example, a device pattern has a straight line shape, thus, W represents a width when viewed in the top-down direction, P represents a pitch when the lines are aligned at equal intervals, and h represents a height of the pattern. In recent years, in the device pattern, since for example, W is about 20 nm, a wavelength of the white light, with which a sample is irradiated, is about 300 nm at the shortest, a condition that the width is a tenth of the wavelength is satisfied.

When the measurement is performed with the white light under such a condition, the pattern is too fine for the wavelength of the white light as probe light, and thus it is possible to achieve approximation by a thin film of a medium obtained by a homogeneously mixture of a material of the line pattern, such as silicon, a material between the lines, that is, vacuum. Such a medium is referred to as an effective medium.

When $e_a$ and $e_b$ represent the known permittivities (complex number) of the silicon and the vacuum, respectively, permittivity e of the effective medium is approximated by the following formula.

$$e=fe_a+(1-f)e_b \quad \text{Formula (1)}$$

$$f=W/P \quad \text{Formula (2)}$$

The permittivity is a spectrum that varies depending on the wavelength. It is possible to calculate a spectrum of reflected light by a Fresnel formula with e and a film thickness d of the effective heterogeneity. Since $e_a$ and $e_b$ are already known, and W and P are not a variable value but a measurement value by the CD-SEM, d is obtained when a shape of a spectrum of reflection ratio R(e, d) calculated with the film thickness d as a variable is most identical with an actually measured reflection spectrum. It is possible to consider that d equals to the height h of an actual line/space pattern.

In addition, Formula (1) is a formula used in a case where a polarizing state of light is mainly parallel to the line/space pattern, and the following Formula (3) is used in a case where the polarizing state of light is orthogonal to the line/space pattern.

$$1/e=f/e_a+(1-f)/e_b \quad \text{Formula (3)}$$

In addition, polarization plates are disposed between the optical fiber and the half mirror, and between the light source and the half mirror, respectively in the optical microscope, and thereby it is possible to switch between the polarizing states according to a direction of the line/space pattern. The two polarization plates are disposed to have orientations parallel to each other, the two polarization plates are caused to simultaneously rotate, and thereby it is possible to switch between the polarizing states parallel or orthogonal to the line/space pattern.

Incidentally, as a method different from the height measurement method described above, a measurement method called scatterometry is known. In this method, laser light is reflected on the sample, and a shape of a cross section of the pattern is estimated from the reflection spectrum. In this method, the reflection spectra formed when the shape of the cross section variously changes are obtained in advance, by calculation, a cross section, which provides a calculated spectrum that is closest to the measured reflection spectrum, is searched for, and the searched spectrum is used as the measurement result.

The scatterometry is a method different from an analysis method or the like using a Fresnel thin film reflection formula as in the example.

In the scatterometry, interference light produced when light having a specific wavelength reaches a three-dimensional structure of a device pattern and is reflected therefrom is obtained by calculating with a geometric model. In this method, since calculation time is taken for an enormous amount of calculation, interference light needs to be calculated and to be organized in a database for various cross sections, and thus a problem arises in that costs increase in mass production.

On the other hand, in the example, the sample is not considered as a three-dimensional structure, but is considered as an even thin film, and thus it is possible to analytically calculate spectra using Fresnel thin film reflection formula. In this manner, since calculation time is little taken, and thus the database does not need to be prepared, it is possible to reduce costs in mass production.

FIG. 3 is a view illustrating a procedure of height measurement of the pattern by using the optical microscope and the scanning electron microscope. First, the positioning pattern is searched for on the wafer with the optical microscope, and the position of the wafer is adjusted (Step 1). Step 1 is an important process for automatically measuring the pattern dimension by the electron microscope, and it is possible to know a coordinate of the position having a known positional relationship between measured patterns by positioning.

Next, the wafer is moved such that the pattern as a measurement target enters the field of sight of the optical microscope, on the basis of the positional coordinate designated in Step 1 (Step 2). For example, in a case where a measurement size of the optical microscope is about 50 micron, a stage, on which the wafer is positioned, is caused to move such that the measurement target pattern is included in a range of 50 micron. The half mirror is disposed on the light path of the optical microscope (Step 3). The half mirror is caused to move such that an angle of a front surface of the half mirror with respect to the light path is constant all the times in a case where the half mirror is caused to move on the light path from a position out of the light path of the optical microscope. In this case, a rail for moving of the half mirror may be prepared, and the half mirror may move on the rail by motor driving.

In a state in which the half mirror is inserted on the light path of the optical microscope, the dimension measurement target pattern and the reflection spectrum of the reflective sample are measured (Steps 4 and 5). After the measurement of the reflection spectrum is ended, the half mirror is retracted from the light path of the optical microscope (Step 6). The half mirror is retracted from the light path of the optical microscope, and thereby the state in which it is possible to measure the film thickness is switched to the state in which it is possible to acquire an image of the positioning pattern image.

Next, the measurement target pattern is positioned in the field of sight of the scanning electron microscope, and dimension measurement of the pattern is performed on the basis of the image of the measurement target pattern, which is obtained on the basis of the scanning of the electron beam, or a waveform signal (Step 7).

The thickness of the thin film is obtained on the basis of the value for dimension of the pattern (light width or pitch) obtained by the above process, and a reflection spectrum of the reflective sample and the actually measured pattern, convert the thickness of the corresponding thin film into the pattern height, and a height of the pattern is output (Steps 8 and 9). Note that the height h of the pattern obtained as above, a width Wt of the upper side of the pattern measured by the electron microscope, width Wb of the lower side, and thus it is possible to obtain an inclined angle θ of the side wall of the pattern by the following Formula.

$$\theta=\arctan\{(2 \times h/(Wb-Wt))\} \quad \text{Formula (4)}$$

In such means, it is possible to measure the pattern height of the fine pattern, which is difficult to be seen in the optical microscope, with accuracy, and using the optical microscope.

Next, example described above will be specifically described. FIG. 4 is a view illustrating an example of the height measurement device configured of a combined device of a scanning electron microscope 400 and an optical microscope 450. The scanning electron microscope 400 is provided with built-in configurational element that is necessary for irradiating the sample with an electron beam, and forming a signal waveform or an image on the basis of a detection signal obtained on the basis of the beam irradiation. An electron beam 403, which is drawn out by a lead electrode 402 from an electron source 401 and is accelerated by an acceleration electrode (not illustrated), is narrowed by a condenser lens 404 as an example of a focusing lens, and then is primarily and secondarily scanned by a scanning deflector 405 on a sample 408. The electron beam 403 is decelerated by a negative voltage applied to an electrode embedded in a stage 409 and is focused due to a lens effect of an objective lens 406, and then the sample 408 is irradiated with the electron beam.

When the sample 408 is irradiated with the electron beam 403, secondary electrons and electrons 410 such as back-scattered electrons are emitted from corresponding irradiation position. The emitted electrons 410 are accelerated in an electron-source direction due to an acceleration effect based on the negative voltage applied to the sample, and collide with a conversion electrode 412, and secondary electrons 411 are generated. The secondary electrons 411 emitted from the conversion electrode 412 are captured by a detector 413, and an output of the detector 413 changes by an amount of captured secondary electrons. Brightness of a display device (not illustrated) changes depending on the output. For example, in a case where two-dimensional image is formed, a deflecting signal to the scanning deflector 405 is synchronized with the output of the detector 413, and an image of the scanning region is formed. In addition, in the scanning electron microscope illustrated in FIG. 4, a beam deflector (not illustrated) that moves over a scanning region of the electron beam is provided. The beam deflector is used to shape an image or the like of the patterns having the same shape which are positioned at different positions. The beam deflector is also referred to as an image shift beam deflector, and is capable of moving to position in the field of sight of the electron microscope without moving of the sample by the sample stage. The image shift deflector and the scanning deflector as common beam deflectors may superimpose a signal for image shifting on a signal for scanning, and the superimposed signal may be supplied to the beam deflector.

Note that an example, in which the electrons emitted from the sample are once converted into conversion electrodes and the conversion electrodes are detected, is described in the example in FIG. 4; however, it is needless to say that the configuration is not limited thereto, and, for example, it is possible to employ a configuration in which an electron multiplier tube or a detection surface of the detector is disposed on trajectories of the accelerated electrons.

A control device 420 controls the configurations of the scanning electron microscope, and has a function of forming an image based on detected electron, and a function of measuring the width of the pattern formed on the sample, on the basis of distribution of intensity of the detection electrons referred to as a line profile. In addition, the control device 420 is provided with a built-in arithmetic processing unit that forms an image on the basis of the obtained signal and performs image processing on the image. The arithmetic processing unit will be described below in detail.

The optical microscope 450 is disposed in a sample chamber 451 separately from the scanning electron microscope 400. Note that the example in which the optical microscope 450 is disposed in the sample chamber 451 is illustrated in the example in FIG. 4; however, the configuration is not limited thereto, and, for example, the optical microscope 450 may be disposed in a preliminary exhaust chamber (not illustrated) of which the atmosphere, in which the sample is positioned, is changed to have the same degree of vacuum as the sample chamber 451 before the sample such as the wafer is introduced in the sample chamber 451. The optical microscope 450 is provided with a built-in light source 452 and a built-in optical element 453 that adjusts optical conditions of the beam emitted from the light source 452. In addition, the optical microscope is provided with a built-in half mirror 455 that polarizes the beam emitted from the light source 452 toward the sample and allows the reflected light from the sample to pass through, a built-in objective lens 454 for magnifying an observation target, and a built-in light receiving element 456 that receives reflected light from the sample. A light signal received by the light receiving element 456 is dispersed by an optical spectrometer 457, and is sent to the control device 420 such that the following processes are to be performed thereon. In addition, the optical microscope 450 is provided with a moving mechanism 458 for causing the half mirror 455 to move between an optical axis and another position out of the optical axis of the optical microscope 450. The control device 420 controls the moving mechanism 458 in accordance with a measurement algorithm which will be described below.

In addition, a reference sample 459 that is made in accordance with the same conditions as the sample 408 is mounted on the stage 409 of the scanning electron microscope illustrated in FIG. 4. Since the reference sample 459 is made in the same processes as the measurement target pattern except that the pattern is not formed on the reference sample, it is possible to use in correction of errors produced on the basis of the changes with time described above.

Note that, in FIG. 4, the combined device of the scanning electron microscope 400 and the optical microscope 450 is described; however, the scanning electron microscope 400 and the optical microscope 450 may be provided as separated devices, the detection signal obtained from the microscope and the microscope may be acquired via network, or a measurement system configured to have the arithmetic processing unit that performs measurement of the pattern may be configured. FIG. 5 is a view illustrating an example of a measurement system configured to have the scanning electron microscope 400, the optical microscope 450, and an arithmetic processing unit 501 that performs measurement of the pattern, based on the detection signals obtained from the microscopes. The processes performed in the arithmetic processing unit 501 may be performed by the control device 420 illustrated in FIG. 4.

The arithmetic processing unit 501 supplies, to the scanning electron microscope 400 and the optical microscope 450, a control signal including measurement conditions and observation conditions, and is provided with an arithmetic processing portion 304 which performs processing in relation to the measurement of the pattern on the basis of the detection signal and the detection results obtained by the scanning electron microscope 400 and the optical microscope 450, and a memory 505 that stores a recipe as an operation information that determines the measurement conditions and the observation conditions, measurement result, or a calculation formula illustrated on the example, or the like. The detection signal obtained by the scanning electron microscope 400 is supplied to an image processing hardware such as a CPU, ASIC, and FPGA which are provided in the arithmetic processing unit 501 in a built-in manner and subjected to image processing corresponding to the purpose.

The arithmetic processing unit 504 is provided with a matching processing portion 506 that performs matching processing for designating a predetermined position on an image formed on the basis of the detection signal obtained by the scanning electron microscope 400 and the optical microscope 450, a film thickness measuring portion 507 that measures a film thickness of a thin film formed on the sample on the basis of the signal obtained by the optical microscope 450, a pattern dimension measuring portion 508 that measures a pattern dimension formed on the sample on the basis of the detection signal of the scanning electron microscope 400, and a pattern height calculation portion 509 that calculates a pattern height on the basis of the detection signal obtained by both of the scanning electron microscope 400 and the optical microscope 450 in a built-in manner.

The measurement conditions or the like can be set by an input device 503, and a recipe for the measurement is generated on the basis of the setting. In addition, a sample coordinate may be designated by the input device 503, and thereby design data of the corresponding coordinate may be read from design data storage medium 502, and figure data formed on the basis of the read design data may be used as a template provided to the matching process of the matching processing portion 506.

The matching processing portion 506 performs the matching process on the image generated from the detection signal obtained by the scanning electron microscope 400 or the optical microscope 450, by using the template recorded in advance. The film thickness measuring portion 507 and the pattern dimension measuring portion 508 perform predetermined measurement by positioning a beam or the optical axis at a measurement target position having a known positional relationship with the matching position.

FIG. 6 is a flowchart illustrating processes of performing pattern height measurement by using the measurement device illustrated in the example in FIG. 4. Note that the measurement system as illustrated in FIG. 5 can also perform the same measurement by linking to coordinate information of the scanning electron microscope 400 and the optical microscope 450. When measurement is performed, first, the sample 408 is introduced to the sample chamber 451, and the stage 409 is controlled such that an evaluation target portion is positioned under the optical axis of the optical microscope 405, on the basis of coordinate information of an evaluation target portion (Steps 601 and 602). Next, an image of the sample is acquired by the optical microscope 450, and pattern matching is performed on the acquired image by using a predetermined template (Steps 603 and 604). In the pattern matching process, in order to search for a measurement target pattern or a unique pattern positioned in the vicinity of the measurement target pattern, a template, on which the same pattern as the corresponding pattern is displayed, is prepared in advance, a degree of identity of the template and the image is evaluated, and thereby a desired position is designated.

The measurement target pattern is accurately positioned on the optical axis of the optical microscope 450, on the basis of a positioning process, and then the control device 420 drives the moving mechanism 458, and inserts the half mirror 455 to the optical axis of the optical microscope 450 (Step 605). The half mirror 455 is inserted into the optical axis, and thereby the sample 408 can be irradiated with the beam emitted from the light source 452. Next, the measurement target pattern is irradiated with the beam emitted from the light source 452, and the detection of the reflection spectrum is performed (Step 606). The light received by the light receiving element 456 passes through an optical fiber and is dispersed for each wavelength by the optical spectrometer 457, and reflection ratio (reflection light intensity) information of the wavelengths λ is transmitted to a storage medium installed in the control device 420.

Next, the stage 409 (sample stage) is driven such that the evaluation target pattern is positioned in the field of sight of the scanning electron microscope 400 on the basis of the coordinate information of the evaluation target pattern (evaluation target portion) (Step 607). The measurement target pattern is positioned in the field of sight of the scanning electron microscope 400, then, for example, acquisition of a low magnification image, and positioning based on the pattern matching on the low magnification image are performed, and further positioning is performed with accuracy. The field of sight of the scanning electron microscope is accurately positioned on the measurement target pattern, then, the electron beam 403 is scanned one-dimensionally, or two-dimensionally, by the scanning deflector 405, a brightness profile is formed, and thereby pattern dimension (line width W and pitch P) is measured (Step 608). W and P represent dimensions in the sample surface direction (X-Y direction) and d, which will be described below, represents a dimension in the Z direction. f is calculated using W and P, which are measured, and Formula (4), and e is obtained using f and Formula (1). Such calculation is performed by the control device 420 or the arithmetic processing portion 504.

$$f = W/P \qquad \text{Formula (4)}$$

Note that the example, in which the pattern height is calculated on the basis of the permittivity e of the medium (substance existing on the normal passing trajectory of light) in Formulas 1 to 3; is described however, it is possible to use refractive index (complex number) N of light of the material. The following relationship is obtained between the permittivity e and a refractive index N.

$$N = e^2 \qquad \text{Formula (5)}$$

Therefore, Formula (1) and Formula (3) can be described using the refractive index N of light of a material.

$$N^{1/2} = f N_a^{1/2} + (1-f) N_b^{1/2} \qquad \text{Formula (6)}$$

$$1/N^{1/2} = f/N_a^{1/2} + (1-f)/N_b^{1/2} \qquad \text{Formula (7)}$$

By using the Formulas, it is possible to obtain the refractive index N ($N_1$ to be described below) of the layer on which the pattern is formed, on the basis of an original refractive index $N_a$ of the material of the pattern and the refractive index $N_b$ of the vacuum.

A method of calculating the reflection ratio R of the front surface is as follows.

$N_0$ represents the refractive index of vacuum (region above the pattern of which the height is measured), $N_1$ represents the refractive index of the layer provided with the pattern, of which the height is measured, and $N_2$ represents the refractive index of the material positioned in a layer under the measurement target pattern.

Since the refractive index of the vacuum, and the refractive index of silicon or $SiO_2$ as materials of the semiconductor device are already known, the indexes are stored in a predetermined storage medium in advance, and calculation for obtaining the refractive index $N_1$ is performed using the Formulas (1) and (2) described above.

$N_1$ represents a value to which a value for the dimension obtained by the measurement by the scanning electron microscope is reflected. W represents the line width of the pattern, P represents the pitch, and f represents a value indicating a ratio of a size of a space in which the patterns are present to a space in which both the patterns and spaces between the patterns are present.

Next, a reflection ratio $r_1$ of an interface between the vacuum and a layer on which the pattern is formed, and a reflection ratio $r_2$ of an interface between the layer on which the pattern is formed and a lower layer under the pattern are obtained, on the basis of the calculated $N_1$ and Formulas 8 and 9, and further the reflection ratio R is calculated on the basis of the corresponding $r_1$, $r_2$, and Formulas 10 and 11.

$$r_1 = (N_0 - N_1)/(N_0 + N_1) \quad \text{Formula (8)}$$

$$r_2 = (N_1 - N_2)/(N_1 + N_2) \quad \text{Formula (9)}$$

$$2\delta = 4\pi/\lambda \cdot d \cdot \cos\phi \quad \text{Formula (10)}$$

$$R = (r_1 + r_2 \cdot e^{-i2\delta})/(1 + r_1 \cdot r_2 \cdot e^{-i2\delta}) \quad \text{Formula (11)}$$

The calculations of Formulas (4) to (11) can be performed by using the measurement values by the scanning electron microscope and the known information. A shape of a waveform spectrum obtained by plotting R described above for each wavelength $\lambda$ of the light is considered to be changed by an amount of the formed pattern. Accordingly, d in Formula (10) is changed and the calculation is repeatedly performed, and a film thickness d is obtained when the waveform spectrum acquired by the optical microscope is identical to the waveform spectrum that is formed on the basis of the known information and the measurement value obtained by the scanning electron microscope. In the example in FIG. 4, since the beam emitted from the light source 452 is perpendicularly incident to the sample 408 via the half mirror 455, $\phi$ is almost zero, and $\cos\phi$ is 1. Note that $2\delta$ represents a phase difference between a wave reflected from the surface of the layer as a height evaluation target and a wave that reciprocates through the corresponding layer and transmits through the front surface of the layer as the evaluation target.

More specifically, R is calculated by changing $\lambda$ from 200 nm to 800 nm per 1 nm for each different film thickness d, and a reflection spectrum for each film thickness d is calculated by plotting the corresponding R for each $\lambda$. The reflection spectra (second reflected light information) obtained by a plurality of calculations are compared to the reflection spectra (first reflected light information) actually obtained by the optical microscope, and it is possible to consider, as the pattern height h, the film thickness d obtained when the second waveform signal, which is closest to the first waveform signal is calculated.

Note that, as a method for comparing two reflection spectra, the following methods are considered. Addition average values of degrees of deviation of R for each different wavelength are compared, and then the smallest addition average value is selected, or the film thickness d used in the calculation of appropriate R is selected by filtering the degrees of deviation of R, which is greater than or equal to a predetermined value. In addition, two comparison methods described above may be used together. Besides, it is possible to apply another method of evaluating a degree of similarity of two waveform shapes.

Steps 609 to 612 in FIG. 6 illustrate a flow of processes from the calculation of the spectrum to the process of selecting appropriate d. In the example in FIG. 6, the process of comparing an actually measured spectrum to a calculated spectrum is performed in a loop until identical spectra are found, and d is output as the pattern height when the degree of identity is confirmed.

As described above, the actually measured spectrum is compared to the calculated spectrum obtained based on pattern information acquired by the scanning electron microscope, d of the calculated spectrum, with which the relationship between both satisfies the predetermined conditions (two spectra are identical, the degree of deviation of two spectra is a predetermined range or lower, or one spectrum has the highest degree of identity to the actually measured spectrum, of the plurality of calculated spectra (the lowest degree of deviation), or the like), is output as the pattern height, and thereby it is possible to obtain appropriate measurement results to which fine pattern information is reflected.

Note that, in the examples described above, the example, in which the spectra are obtained while the film thickness d is changed, is described; however, a model of the spectra may be formed in advance for each combination of three parameters of W, P, and d, the model and the spectra obtained by the optical microscope may be compared to each other, and d of the most approximate model may be output as the pattern height.

REFERENCE SIGNS LIST 400 scanning electron microscope
401 electron source
402 extraction electrode
403 electron beam
404 condenser lens
405 scanning deflector
406 objective lens
408 sample
409 stage
410 electron
411 secondary electron
412 conversion electrode
413 detector
420 control device
450 optical microscope
451 sample chamber
452 light source
453 optical element
454 objective lens
455 half mirror
456 light receiving element
457 optical spectrometer
458 moving mechanism
459 reference sample

The invention claimed is:

1. A pattern height measurement device comprising:
a scanning electron microscope configured to irradiate a sample arranged on a sample stage with a charged particle beam;
an optical microscope configured to irradiate the sample with light;
a moving mechanism configured to move the sample stage between the scanning electron microscope and the optical microscope;
an optical device that detects reflected light produced when the sample is irradiated with the light; and
a calculation device that calculates a dimension of the sample in a height direction, on the basis of first reflected light information acquired by dispersing the reflected light produced when the sample is irradiated with the light,
wherein the calculation device calculates second reflected light information on the basis of a formula for a relationship between a value for dimension of a pattern formed on the sample in a surface direction of the sample, which is obtained by irradiating the sample with the charged particle beam, a value for the dimension of the sample in the height direction, and reflected light information, compares the second reflected light intensity and the first reflected light information, and outputs, as the dimension of the pattern in the height direction, a value for the dimension of the sample in the height direction in the second reflected light information, which is obtained when the first reflected light information and the second reflected light information satisfy a predetermined condition; and wherein the calculation device calculates R as the second reflected light information on the basis of the following computing equations:

$$N^{1/2} = fN_a^{1/2} + (1-f)N_b^{1/2}$$

$$r_1 = (N_0 - N_1)/(N_0 + N_1)$$

$$r_2 = (N_1 - N_2)/(N_1 + N_2)$$

$$2\delta = 4\pi/\lambda \cdot d \cdot \cos\phi$$

$$R = (r_1 + r_2 \cdot e^{-i2\delta})/(1 + r_1 \cdot r_2 \cdot e^{-i2\delta})$$

N, $N_1$: refractive index of light of layer on which pattern is formed
$N_0$, $N_b$: refractive index of light of vacuum
$N_a$: refractive index of light of material of layer on which pattern is formed
$N_2$: refractive index of light of region below pattern
W: pattern width
P: pattern pitch
$2\delta$: phase difference
X: wavelength of light
d: pattern height
$\phi$: incident angle of light
R: reflected light information.

2. The pattern height measurement device according to claim 1,
wherein the calculation device outputs, as the dimension of the pattern in the height direction, a value for the dimension of the sample in the height direction in one item of second reflected light information having the highest degree of identity to the first reflected light information, of the second reflected light information acquired when the first reflected light information is identical to the second reflected light information, the second reflected light information acquired when the second reflected light information has a degree of similarity to the first reflected light information which is a predetermined range or lower, or a plurality of items of second reflected light information.

3. The pattern height measurement device according to claim 1,
wherein the first reflected light information is a reflection spectrum obtained by dispersing the reflected light.

4. The pattern height measurement device according to claim 1,
wherein the calculation device inputs, into the formula for the relationship, the values of the dimensions of a plurality of the samples in the height direction, and calculates the plurality of items of second reflected light information.

5. The pattern height measurement device according to claim 1,
wherein the calculation device forms a reflection spectrum as the second reflected light information by plotting the R for each wavelength.

6. A charged particle beam device comprising:
a scanning electron microscope configured to irradiate a sample arranged on a sample stage with a charged particle beam;
a moving mechanism configured to move the sample stage between the scanning electron microscope and an optical microscope that irradiates the sample with light;
an optical device that detects reflected light produced when the sample is irradiated with the light; and
a calculation device that measures a dimension of a pattern formed on a sample, on the basis of a detection signal acquired by scanning of the charged particle beam emitted from a charged particle source,
wherein the calculation device calculates a height of the pattern on the basis of first reflected light information of the optical device and the detection signal acquired by scanning of the charged particle beam; and
wherein the calculation device calculates R as the second reflected light information on the basis of the following computing equations:

$$N^{1/2} = fN_a^{1/2} + (1-f)N_b^{1/2}$$

$$r_1 = (N_0 - N_1)/(N_0 + N_1)$$

$$r_2 = (N_1 - N_2)/(N_1 + N_2)$$

$$2\delta = 4\pi/\lambda \cdot d \cdot \cos\phi$$

$$R = (r_1 + r_2 \cdot e^{-i2\delta})/(1 + r_1 \cdot r_2 \cdot e^{-i2\delta})$$

N, $N_1$: refractive index of light of layer on which pattern is formed
$N_0$, $N_b$: refractive index of light of vacuum
$N_a$: refractive index of light of material of layer on which pattern is formed
$N_2$: refractive index of light of region below pattern
W: pattern width
P: pattern pitch
$2\delta$: phase difference
X: wavelength of light
d: pattern height
$\phi$: incident angle of light
R: reflected light information.

7. The charged particle beam device according to claim 6,
wherein the calculation device calculates second reflected light information on the basis of a formula for a relationship between a value for a dimension of a pattern formed on the sample in a surface direction of the sample, which is obtained by irradiating the sample with a charged particle beam, a value for a dimension of the sample in the height direction, and reflected light information, compares the second reflected light intensity and the first reflected light information, and outputs, as the dimension of the pattern in the height direction, a value for the dimension of the sample in the height direction in the second reflected light information, which is obtained when the first reflected light information and the second reflected light information satisfy a predetermined condition.

8. The charged particle beam device according to claim 6,
wherein the calculation device outputs, as the dimension of the pattern in the height direction, a value for the dimension of the sample in the height direction in one item of second reflected light information having the highest degree of identity to the first reflected light information, of the second reflected light information acquired when the first reflected light information is identical to the second reflected light information, the second reflected light information acquired when the second reflected light information has a degree of similarity to the first reflected light information which is a predetermined range or lower, or a plurality of items of second reflected light information.

9. The charged particle beam device according to claim 6, wherein the first reflected light information is a reflection spectrum obtained by dispersing the reflected light.

10. The charged particle beam device according to claim 6,
wherein the calculation device inputs, into the formula for the relationship, the values of the dimensions of a plurality of the samples in the height direction, and calculates the plurality of items of second reflected light information.

11. The charged particle beam device according to claim 6,
wherein the calculation device forms a reflection spectrum as the second reflected light information by plotting the R for each wavelength.

12. A charged particle beam device comprising:
a scanning electron microscope configured to irradiate a sample arranged on a stage with a charged particle beam;
a moving mechanism configured to move the sample stage between the scanning electron microscope and an optical microscope that irradiates the sample with light;
an optical device that detects reflected light produced when the sample is irradiated with the light; and
a calculation device that measures a height of a pattern formed on the sample, on the basis of a detection signal acquired by scanning of a charged particle beam emitted from a charged particle source;
wherein the calculation device searches for a position aligning pattern formed on the sample, when the sample is moved such that the pattern, which is to be measured, is contained in the field of sight of the optical device, on the basis of the reflected light detected by the optical device, and calculates the height of the pattern on the basis of a reflection spectrum of the reflected light detected by the optical device and the detection signal acquired by scanning of the charged particle beam, when the height of the pattern is measured.

13. The charged particle beam device according to claim 12,
wherein the optical device includes a light source for performing irradiation with the light, and a moving mechanism for performing insertion of a half mirror that polarizes light emitted from the light source such that the light travels toward a sample when the reflection spectrum is acquired.

* * * * *